(12) United States Patent
Wu et al.

(10) Patent No.: US 8,509,136 B2
(45) Date of Patent: Aug. 13, 2013

(54) NETWORK CODING METHOD AND NETWORK CODING APPARATUS

(75) Inventors: Jianming Wu, Kawasaki (JP); Yoshinori Tanaka, Kawasaki (JP); Kazuhisa Obuchi, Kawasaki (JP); Mitsuhiro Azuma, Kawasaki (JP); Tomohiko Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 685 days.

(21) Appl. No.: 12/767,913

(22) Filed: Apr. 27, 2010

(65) Prior Publication Data

US 2011/0110284 A1    May 12, 2011

Related U.S. Application Data

(63) Continuation of application No. PCT/JP2007/001202, filed on Nov. 2, 2007.

(51) Int. Cl.
| | |
|---|---|
| H04H 20/71 | (2008.01) |
| H04J 9/00 | (2006.01) |
| H04L 25/60 | (2006.01) |
| H04L 27/36 | (2006.01) |
| H04B 7/14 | (2006.01) |

(52) U.S. Cl.
USPC ........... 370/312; 370/204; 375/214; 375/298; 455/20

(58) Field of Classification Search
USPC ....... 370/315–327, 328–330, 428; 455/7–24; 375/211–215, 260–281, 298
See application file for complete search history.

(56) References Cited

U.S. PATENT DOCUMENTS

| | | | | |
|---|---|---|---|---|
| 6,163,531 | A * | 12/2000 | Kumar | 370/260 |
| 6,404,745 | B1 * | 6/2002 | O'Neil et al. | 370/260 |
| 6,775,247 | B1 * | 8/2004 | Shaffer et al. | 370/260 |
| 6,943,819 | B2 * | 9/2005 | Takaki et al. | 348/14.02 |
| 7,023,933 | B2 * | 4/2006 | Murakami et al. | 375/295 |
| 7,929,930 | B2 * | 4/2011 | Sivanesan et al. | 455/185.1 |
| 8,135,087 | B2 * | 3/2012 | Lee et al. | 375/276 |
| 2003/0021297 | A1 * | 1/2003 | Miyashita et al. | 370/503 |

(Continued)

FOREIGN PATENT DOCUMENTS

| | | |
|---|---|---|
| CN | 1929470 | 3/2007 |
| JP | 2006-33883 | 2/2006 |

(Continued)

OTHER PUBLICATIONS

First Notification of Office Action issued for corresponding Chinese Patent Application No. 200780101301.1, issued Sep. 5, 2012, with English translation.

(Continued)

*Primary Examiner* — Thai Hoang
(74) *Attorney, Agent, or Firm* — Myers Wolin, LLC

(57) ABSTRACT

A base station BS transmits downlink data to a relay station RS. A mobile station MS transmits uplink data to the relay station RS. The relay station RS determines a first modulation scheme for transmitting the uplink data to the base station BS, and determines a second modulation scheme for transmitting the downlink data to the mobile station MS. The relay station RS multiplies a symbol sequence obtained by the first modulation scheme by a symbol sequence obtained by the second modulation scheme for each symbol, and multicasts the multiplication result to the base station BS and the mobile station MS.

15 Claims, 18 Drawing Sheets

(56) References Cited

U.S. PATENT DOCUMENTS

| | | | |
|---|---|---|---|
| 2003/0063573 A1* | 4/2003 | Vandermersch | 370/260 |
| 2004/0152490 A1* | 8/2004 | Aoyama et al. | 455/560 |
| 2006/0056376 A1 | 3/2006 | Terry et al. | |
| 2007/0058745 A1 | 3/2007 | Watanabe | |
| 2008/0186899 A1* | 8/2008 | Zhu et al. | 370/315 |
| 2010/0246475 A1* | 9/2010 | Naden et al. | 370/315 |

FOREIGN PATENT DOCUMENTS

| | | |
|---|---|---|
| JP | 2007-235263 | 9/2007 |
| WO | 2006/104105 | 10/2006 |
| WO | 2007/000742 | 1/2007 |
| WO | 2007/125580 | 11/2007 |

OTHER PUBLICATIONS

Rudolf Ahlswede et al.; "Network Information Flow"; IEEE Transactions on Inforation Theory, vol. 46, No. 4, Jul. 2000.

Sachin Katti et al.; "XORs in The Air: Practical Wireless Network Coding"SIGCOMM '06, Pisa, Italy, Sep. 11-15, 2006.

Peter Larsson et al; "Coded Bi-directional Relaying"; 63rd Vehicular Technology Conference 2006; VTC 2006—Spring, May 7, 2006, vol. 2; pp. 851-855; [Ref.: ISR dated Dec. 11, 2007].

Peter Popovski et al.; "Wireless Network Coding by Amplify-and-Forward for Bi-Directional Traffic Flows"; IEEE Communications Letters, Jan. 2007, vol. 11, No. 1; pp. 16-18; [Ref.: ISR dated Dec. 11, 2007].

Peter Popovski et al.; "Anti-Packets Can Increase the Achievable Throughput of a Wireless Multi-Hop Network"; pp. 3885-3890; IEEE Communications Society subject matter experts for publication in the IEEE ICC 2006 proceedings.Copyright by IEEE 2006.

Sang Joon Kim et al.: "Performance Bonds for Bi-Directional Coded Cooperation Protocols"; pp. 83-91 27th International Conference on Distributed Computing Systems Workshops (ICDCSW '07); Jun. 22, 2007.

Tobias J. Oechtering et al.;"Achievable Rate Region of a Two Phase Bidirectional Relay Channel"; 41st Annual Conference on Information Sciences and Systems, 2007, pp. 408-413 (CISS '07), Mar. 14, 2007; [Ref.: ISR dated Dec. 11, 2007].

International Search Report for corresponding International Patent Application No. PCT/JP2007/001202, mailed Dec. 11, 2007.

Petar Popovski et al.; "Wireless Network Coding by Amplify-and-Forward for Bi-Directional Traffic Flows"; IEEE Communications Letters, vol. 11, No. 1, Jan. 2007.

Hyun Jong Yang et al.; "Zero-Forcing Based Two-phase Relaying"; IEEE Communications Society, pp. 5224-5228; dated Jun. 24, 2007.

Second Office Action issued for corresponding Chinese Patent Application No. 200780101301.1, dated Apr. 3, 2013 with an English translation.

* cited by examiner

P-1

P-2

P-3

| RELAY SYSTEM | NUMBER OF PHASES | THROUGHPUT GAIN (TWO-HOP COMMUNICATION) | RELIABILITY OF LINK | FLEXIBILITY OF COMMUNICATION |
|---|---|---|---|---|
| CLASSICAL RELAYING | 4 | — | VERY GOOD | HIGH |
| DF | 3 | 33% | GOOD | LOW |
| AF | 2 | 100% | POOR | VERY LOW |

RELATED ART

FIG. 2

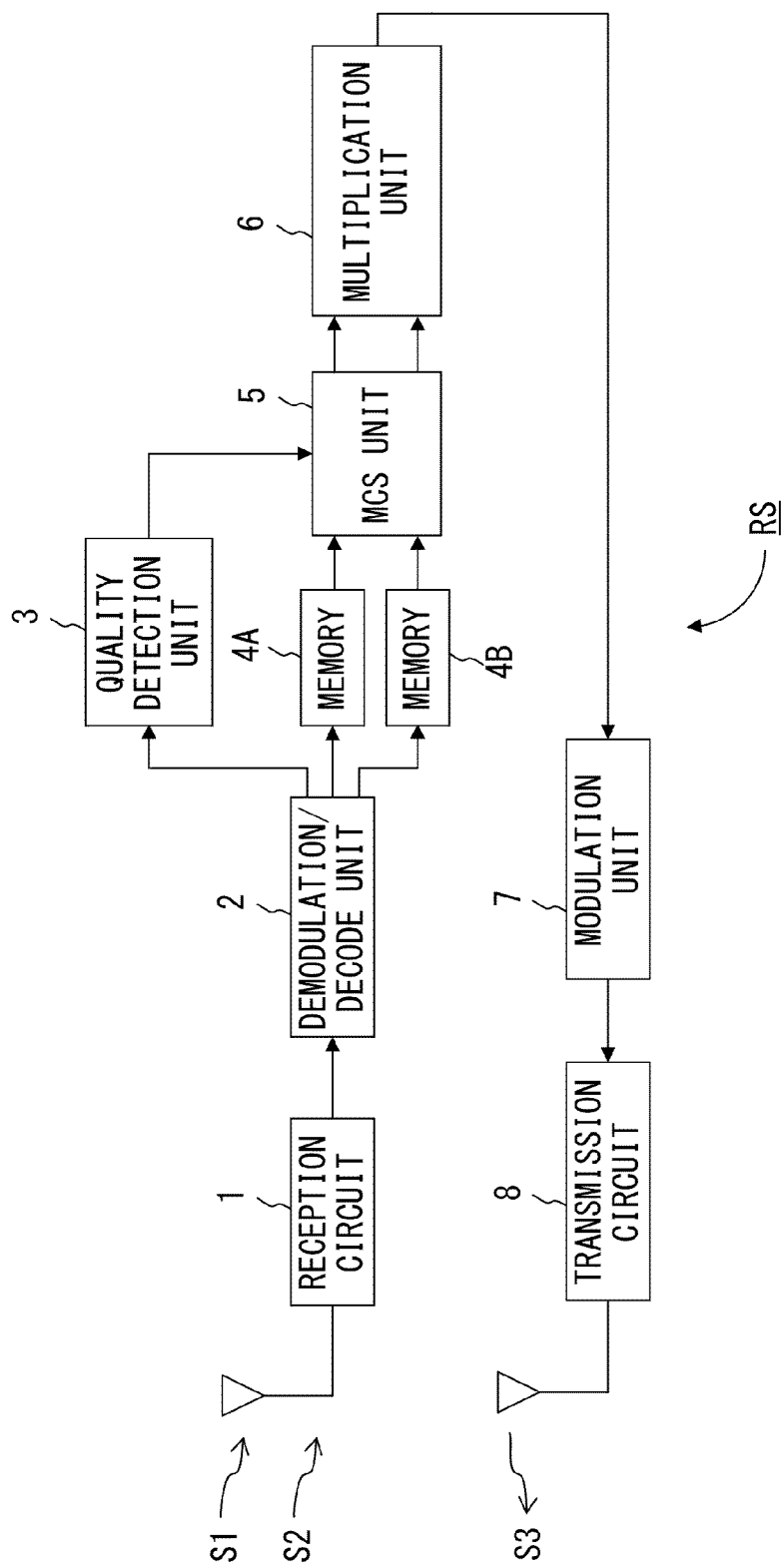
F I G. 4

| RELAY SYSTEM | NUMBER OF PHASES | THROUGHPUT GAIN (TWO-HOP COMMUNICATION) | RELATIONSHIP OF LINK | FLEXIBILITY OF COMMUNICATION |
|---|---|---|---|---|
| CLASSICAL RELAYING | 4 | — | VERY GOOD | HIGH |
| DF | 3 | 33% | GOOD | LOW |
| AF | 2 | 100% | POOR | VERY LOW |
| EMBODIMENT | 3 | 33% | GOOD | HIGH |

FIG. 12

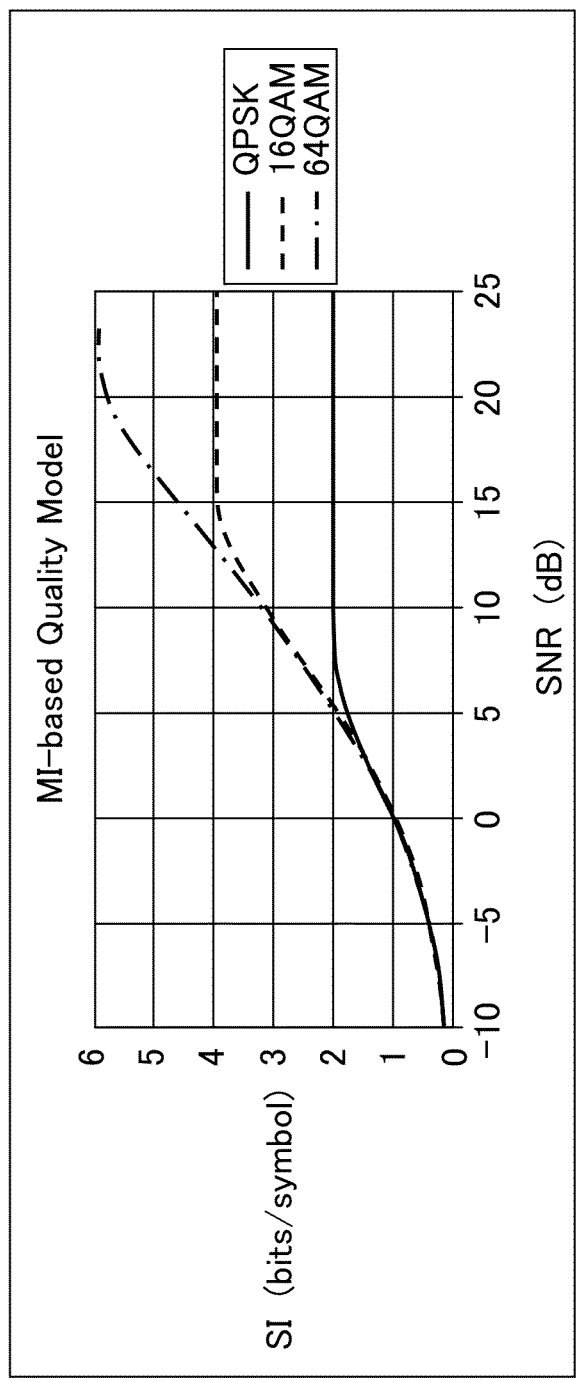
F I G. 13

NETWORK CODING METHOD AND NETWORK CODING APPARATUS

CROSS-REFERENCE TO RELATED APPLICATIONS

This application is a continuation of the PCT Application No. PCT/JP2007/001202, filed on Nov. 2, 2007, the entire contents of which are incorporated herein by reference.

FIELD

The present invention relates to a network coding method and a network coding apparatus, and more specifically to a network coding method and a network coding apparatus for bi-directionally transmitting a radio signal between communication devices through a relay station.

BACKGROUND

The simplest system for transmitting a signal between communication devices is configured to transmit a signal from one communication device directly to another communication device. However, to guarantee the quality of wireless communications in this system, it is necessary, for example, to enhance transmission power or reduce a size of a wireless cell. In the first case, the power consumption increases. In the second case, since the number of base stations increases, the cost for configuring the system increases.

To solve the problem, a configuration of providing a relay station between communication devices is proposed and implemented. Described below is a system of providing a relay station RS between a base station BS and a mobile station MS, and performing a two-hop transmission between the base station BS and the mobile station MS.

FIG. 1A illustrates a classical relay system. In this relay system, the following four phases are necessary to bi-directionally transmit a signal between the base station BS and the mobile station MS.
(1) The base station BS transmits a signal to the relay station RS.
(2) The relay station RS transmits the signal to the mobile station MS.
(3) The mobile station MS transmits a signal to the relay station RS.
(4) The relay station RS transmits the signal to the base station BS.
Therefore, the relay system requires four communication resources orthogonal to one another.

FIG. 1B illustrates an example of a conventional network coding system. In this relay system, the following three phases are necessary to bi-directionally transmit a signal between the base station BS and the mobile station MS.
(1) The base station BS transmits a signal S1 to the relay station RS through a link D1.
(2) The mobile station MS transmits a signal S2 to the relay station RS through a link D2.
(3) The relay station RS decodes the signals S1 and S2, performs exclusive-OR operation (XOR) for each bit of a set of the decoded data, and multicasts a result of the operation to the base station BS and the mobile station MS. The multicast packet is assigned a header, a CRC, and an FEC.

The system is sometimes called DF (Decode-and-Forward) relaying. The DF relaying requires three communication resources orthogonal to one another. As compared with the classical relay system illustrated in FIG. 1A, the throughput gain in two-hop communication may be achieved up to 33 percent at maximum in theory. When the hop count increases, the throughput gain of the DF relaying is achieved up to a double of the throughput of the classical relay system illustrated in FIG. 1A in theory.

In the conventional DF relaying, the relay station RS performs exclusive-OR operation for each bit. Then, the base station BS and the mobile station MS receive the signal "S1 XOR S2", respectively. The base station BS can obtain the signal S2 by performing exclusive-OR operation on the received signal and the signal S1. That is, the base station BS can receive the signal S2 transmitted from the mobile station MS. Similarly, the mobile station MS can receive the signal S1 transmitted from the base station BS. Thus, a bi-directional communication is realized. The DF relaying is described in, for example, P. Larsson, N. Johansson, K. E. Sunell, "Coded bi-directional relaying", the 5th Scandinavian WS on Wireless Ad-Hoc Networks (AdHoc' 05), Stochholm, Sweden, May 2005.

FIG. 1C illustrates another conventional network coding system. The relay system bi-directionally transmits a signal between the base station BS and the mobile station MS in the following two phases.
(1) A signal transmission from the base station BS to the relay station RS and a signal transmission from the mobile station MS to the relay station RS are simultaneously performed.
(2) The relay station RS amplifies interfered signals and multicasts the signals to the base station BS and the mobile station MS. At this time, the relay station RS does not decode the received signals.

The system is sometimes called AF (Amplified-and-Forward) relaying. The AF relaying requires only two communication resources orthogonal to each other. Therefore, the throughput gain of the AF relaying is double at maximum in theory compared with the classical relay system illustrated in FIG. 1A. The AF relaying is described in, for example, P. Popovsiki, and H. Yomo, "Wireless network coding by amplify-and-forward for bi-directional traffic flows", IEEE Communications Letters, Vol. 11, No. 1, pp 16-18, January 2007.

However, the relay systems illustrated in FIGS. 1A through 1C have respective drawbacks as illustrated in FIG. 2. Since each phase is independently controlled in the classical relay system illustrated in FIG. 1A, the reliability of a link is high, and the flexibility (or freedom) of communications is also high. However, since the number of phases increases and the throughput is degraded in this relay system, the communication efficiency is reduced. The "flexibility of communications" refers to, although not univocally, the freedom in selecting a modulation scheme and a coding rate for a data transmission.

In the DF relaying illustrated in FIG. 1B, the reliability of a link is somewhat lower than in the system illustrated in FIG. 1A. The conventional DF relaying has a configuration in which XOR operation is performed on each bit of the data received from a pair of links, and the result of the operation is multicast. Thus, the same amount of data is to be transmitted through the pair of links. Therefore, when the communication quality of the pair of links is unbalanced, the data transmission of a link with higher communication quality is restricted by the data transmission of a link with lower communication quality.

The AF relaying illustrated in FIG. 1C has no communication flexibility. In addition, in an environment at a high noise level, the noise is also amplified in the relay station RS. Therefore, the communication performance is largely reduced. Although the problem may be reduced by implementing, for example, a DNF (Denoise-and-Forward) relay system, the configuration of the relay station is complicated and requires a higher cost.

SUMMARY

The network encoding method according to the present invention is to transmit a signal between a first communication device and a second communication device through a third communication device. The method includes; determining a first communication scheme for transmitting to the first communication device first data received from the second communication device; determining a second communication scheme for transmitting to the second communication device second data received from the first communication device; generating a multicast signal by multiplying a first symbol sequence obtained by processing the first data according to the first communication scheme by a second symbol sequence obtained by processing the second data according to the second communication scheme for each symbol; and transmitting the multicast signal from the third communication device to the first and second communication devices.

According to this method, the first communication scheme for transmitting data to the first communication device and the second communication scheme for transmitting data to the second communication device can be determined independently of each other. Therefore, although the quality of a set of links is unbalanced, the communication of a link with higher quality is not restricted by the communication of a link with lower quality.

Accordingly, the disclosed method realizes network encoding with high communication efficiency.

BRIEF DESCRIPTION OF DRAWINGS

FIG. 2 is a table for comparison of conventional relay systems;

FIG. 4 illustrates a configuration of a relay station;

FIG. 12 is a table for comparison between a conventional system and an embodiment;

FIG. 13 illustrates the relationship between SNR and amount of mutual information;

DESCRIPTION OF EMBODIMENTS

Figure 3:
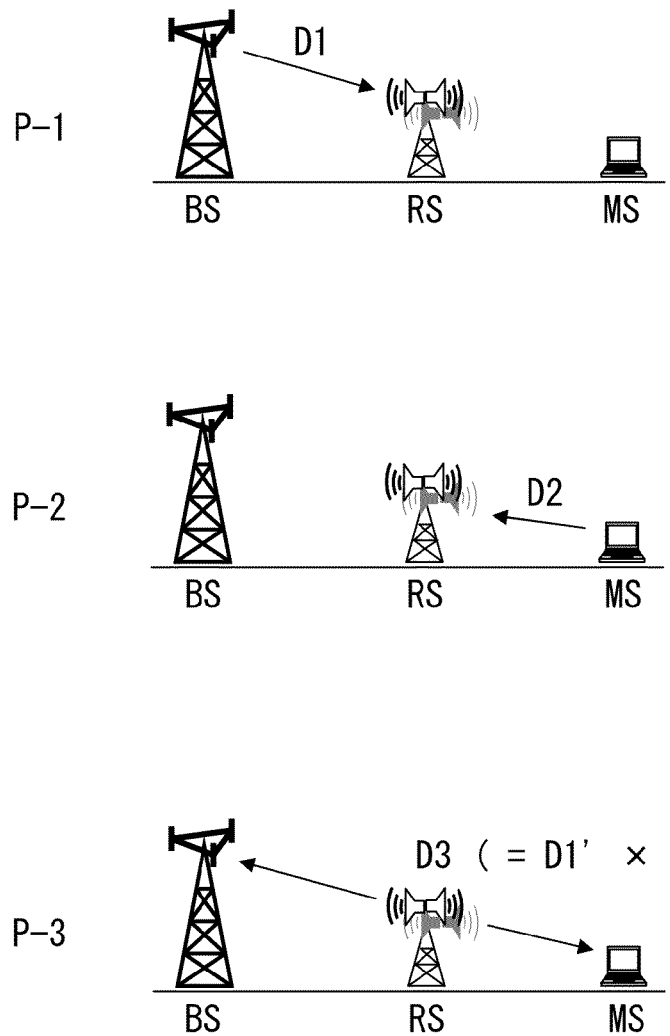
FIG. 3 is an explanatory view of a network coding system according to an embodiment of the present invention.

FIG. 3 is an explanatory view of a network coding system according to an embodiment of the present invention. Described below is a system for providing an relay station RS between a base station BS and a mobile station MS, and bi-directionally performing two-hop transmission between the base station BS and the mobile station MS.

The relay system according to the embodiment realizes a coded bi-directional transmission between the base station BS and the mobile station MS according to the following three phases. In this embodiment, it is assumed that downlink data is transmitted from the base station BS to the mobile station MS, and uplink data is transmitted from the mobile station MS to the base station BS.

(1) The base station BS transmits downlink data to the relay station RS using a signal 51 through a link D1.
(2) The mobile station MS transmits uplink data to the relay station RS using a signal S2 through a link D2.
(3) The relay station RS regenerates the downlink data and the uplink data by respectively decoding the signals 51 and S2. The relay station RS determines a first communication scheme for transmitting the uplink data to the base station BS, and a second communication scheme for transmitting the downlink data to the mobile station MS. Furthermore, the relay station RS generates a first symbol sequence by modulating the uplink data according to the first communication scheme, and generates a second symbol sequence by modulating the downlink data according to the second communication scheme. The first and second symbol sequences are multiplied for each symbol. Thus, a multicast signal S3 is generated. The relay station RS transmits the multicast signal S3 to the base station BS and the mobile station MS through a multicast link D3.

In FIG. 3, a link D1' transmits the first symbol sequence (that is, uplink data modulated according to the first communication scheme) from the relay station RS to the base station BS. A link D2' transmits a second symbol sequence (that is, downlink data modulated according to the second communication scheme) from the relay station RS to the mobile station MS. The multicast link D3 is obtained by performing multiplication of the links D1' and D2'.

The base station BS holds the previously transmitted downlink data. Therefore, the base station BS can regenerate the uplink data by removing the downlink data component from the multicast signal S3. Similarly, the mobile station MS holds the previously transmitted uplink data. Therefore, the mobile station MS can regenerate the downlink data by removing the uplink data component from the multicast signal S3. Therefore, bi-directional communication (a transmission of downlink data from the base station BS to the mobile station MS, and a transmission of uplink data from the mobile station MS to the base station BS) is realized.

FIG. 4 illustrates a configuration of the relay station RS. In FIG. 4, a circuit not directly relating to the network coding is omitted.

A reception circuit 1 receives a radio signal. In this example, the received signal includes the signal S1 transmitted from the base station BS and the signal S2 transmitted from the mobile station MS. In this example, each received signal includes a data channel, a control channel, and a pilot channel. A demodulation/decode unit 2 includes an A/D converter and an orthogonal transformer, and decodes each channel included in the received signal. The communication scheme (modulating method, code, etc.) of the data channel may be fixedly determined in advance or notified through the control channel.

A quality detection unit 3 detects the communication quality of the link D1' for transmitting a signal from the relay station RS to the base station BS. The communication quality of the link D1' is detected in the base station BS using a pilot signal transmitted from the relay station RS to the base station BS. The detection result is notified from the base station BS to the relay station RS through, for example, the control channel. Similarly, the quality detection unit 3 detects the communication quality of the link D2' for transmitting a signal from the relay station RS to the mobile station MS.

The MCS (modulation and coding scheme) of the link D1' may be determined by the base station BS depending on the detected communication quality, or may be determined in the relay station RS depending on the notified detection result. When the MCS is determined in the base station BS, the determined MCS is notified to the relay station RS through the control channel. Similarly, the MCS of the link D2' may be determined in the mobile station MS or the relay station RS. When the MCS is determined in the mobile station MS, the determined MCS is notified to the relay station RS. The MCS is described later.

The data (downlink data transmitted from the base station BS to the mobile station MS) obtained by decoding the signal S1 is stored in memory 4A. On the other hand, the data (uplink data transmitted from the mobile station MS to the base station BS) obtained by decoding the signal S2 is stored in memory 4B.

An MCS (modulation and coding scheme) unit 5 extracts necessary information from the control channel. When the "communication quality of a link" is received from the base station BS and/or the mobile station MS, the MCS unit 5 determines a communication scheme for transmitting data based on the quality of the corresponding link. For the communication scheme, for example, a modulation method and an coding rate are determined. In this embodiment, the modulation method is selected from among QPSK, 16QAM, and 64QAM. In this case, for example, if the communication quality is lower than a threshold level, QPSK is selected. If the communication quality exceeds the threshold level, 16QAM is selected. If the communication quality is very good, 64QAM is selected. That is, for example, when the communication quality of the link between the base station BS and the relay station RS exceeds the threshold level, then 16QAM is selected as the modulation method for transmitting the uplink data to the base station BS. If the communication quality of the link between the mobile station MS and the relay station RS is lower than the threshold level, then QPSK is selected as the modulation method for transmitting the downlink data to the mobile station MS. The communication scheme is not limited to QPSK, 16QAM, and 64QAM, but may be other modulation methods (for example, 32QAM, 128QAM, 256QAM, etc.).

When the MCS unit 5 receives the "information indicating MCS" from the base station BS and/or the mobile station MS, it is not necessary to perform the determining procedure above. That is, the above-mentioned determining procedure is performed by the base station BS and/or the mobile station MS.

The MCS unit 5 generates a set of transmission symbol sequences by processing the uplink data and the downlink data according to the MCS determined as described above. Thus, in the network coding method according to the embodiment, the uplink data and the downlink data may be transmitted in different MCS. The uplink data and the downlink data may also be transmitted in the same MCS.

A multiplication unit 6 performs a multiplication on the set of transmission symbol sequences obtained by the MCS unit 5 sequentially for each symbol, thereby generating the multicast signal S3. After the modulation by a modulation unit 7, the multicast signal S3 is transmitted by a transmission circuit 8 to the base station BS and the mobile station MS. The relay station RS transmits MCS information indicating the MCS determined by the MCS unit 5 to the base station BS and the mobile station MS using the control channel.

Figure 5:
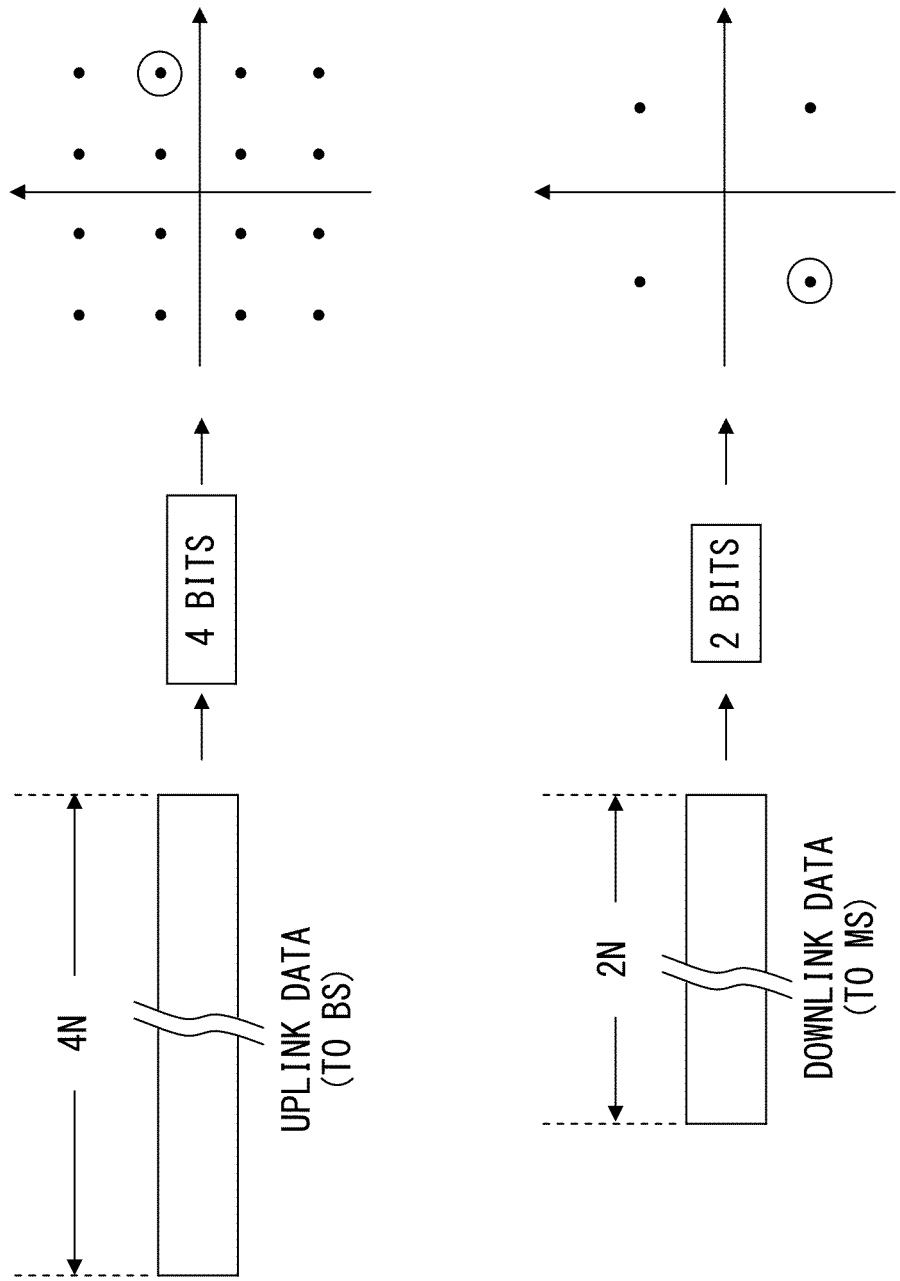
FIG. 5 is an explanatory view of the operation of an MCS unit.

FIG. 5 is an explanatory view of the operation of the MCS unit 5. In this example, it is assumed that the uplink data to be transmitted from the relay station RS to the base station BS is modulated in 16QAM, and the downlink data to be transmitted from the relay station RS to the mobile station MS is modulated in QPSK. It is also assumed that N symbols are transmitted in one transmission block.

In this case, 4N bits of uplink data is read from the memory 4B, and the uplink data is sectioned at every fourth bit. Each 4-bit data is sequentially arranged at a corresponding signal point on the 16QAM constellation. On the other hand, 2N bits of downlink data is read from the memory 4A, and the downlink data is sectioned at every second bit. Each 2-bit data is sequentially arranged at a corresponding signal point on the QPSK constellation.

Figure 6:
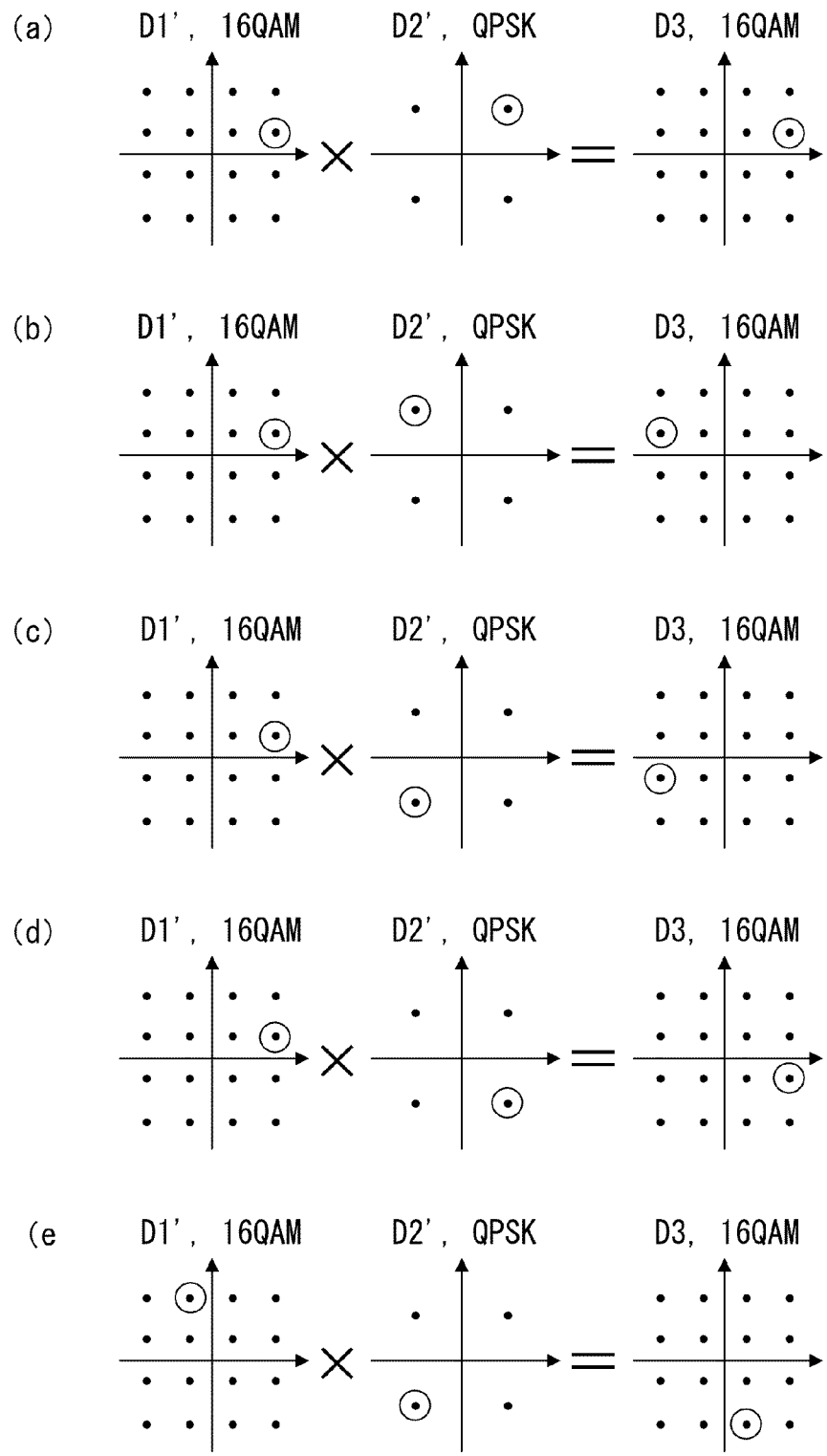
FIG. 6 is an explanatory view of the operation of a multiplication unit.

FIG. 6 is an explanatory view of the operation of the multiplication unit 6. The multiplication unit 6 performs a multiplication on the set of transmission symbol sequences obtained by the MCS unit 5 sequentially for each symbol. In the example illustrated in FIG. 6, the 16QAM symbol is multiplied by the QPSK symbol. It is assumed that the power at the signal point on the QPSK constellation is normalized. Then, the signal point of the result of the multiplication is obtained by rotating the signal point of the 16QAM signal by the phase corresponding to the signal point of the QPSK signal as illustrated by (a) through (d) in FIG. 6.

That is, for example, when the 2-bit data of the QPSK symbol is "11", the signal point of the result of the multiplication is the same as the signal point of the 16QAM symbol as illustrated by (a) in FIG. 6. The "multiplication" is a complex multiplication. In this embodiment, when one symbol is represented by "a1+jb1" and another symbol is represented by "a2+jb2", it is assumed that the result of the multiplication is "a1a2+jb1b2".

(b), (c), and (d) in FIG. 6 indicate the signal points of the result of the multiplication when the 2-bit data of the QPSK symbol are "01", "00", and "10", respectively. In addition, (e) in FIG. 6 indicates an example of different 16QAM symbol.

The relay station RS in the embodiment transmits the operation result obtained as described above as a multicast signal S3 to the base station BS and the mobile station MS. Therefore, each symbol of the multicast signal S3 includes the modulation component of a symbol for transmitting the uplink data, and the modulation component of a corresponding symbol for transmitting of the downlink data.

When one link is QPSK and another link is 64QAM, the multiplication operation is also performed as in the procedure described above with reference to FIG. 6. That is, the signal point of the result of the multiplication is obtained by rotating the signal point of the 64QAM symbol by the phase corresponding to the signal point of the QPSK symbol.

Figure 7:
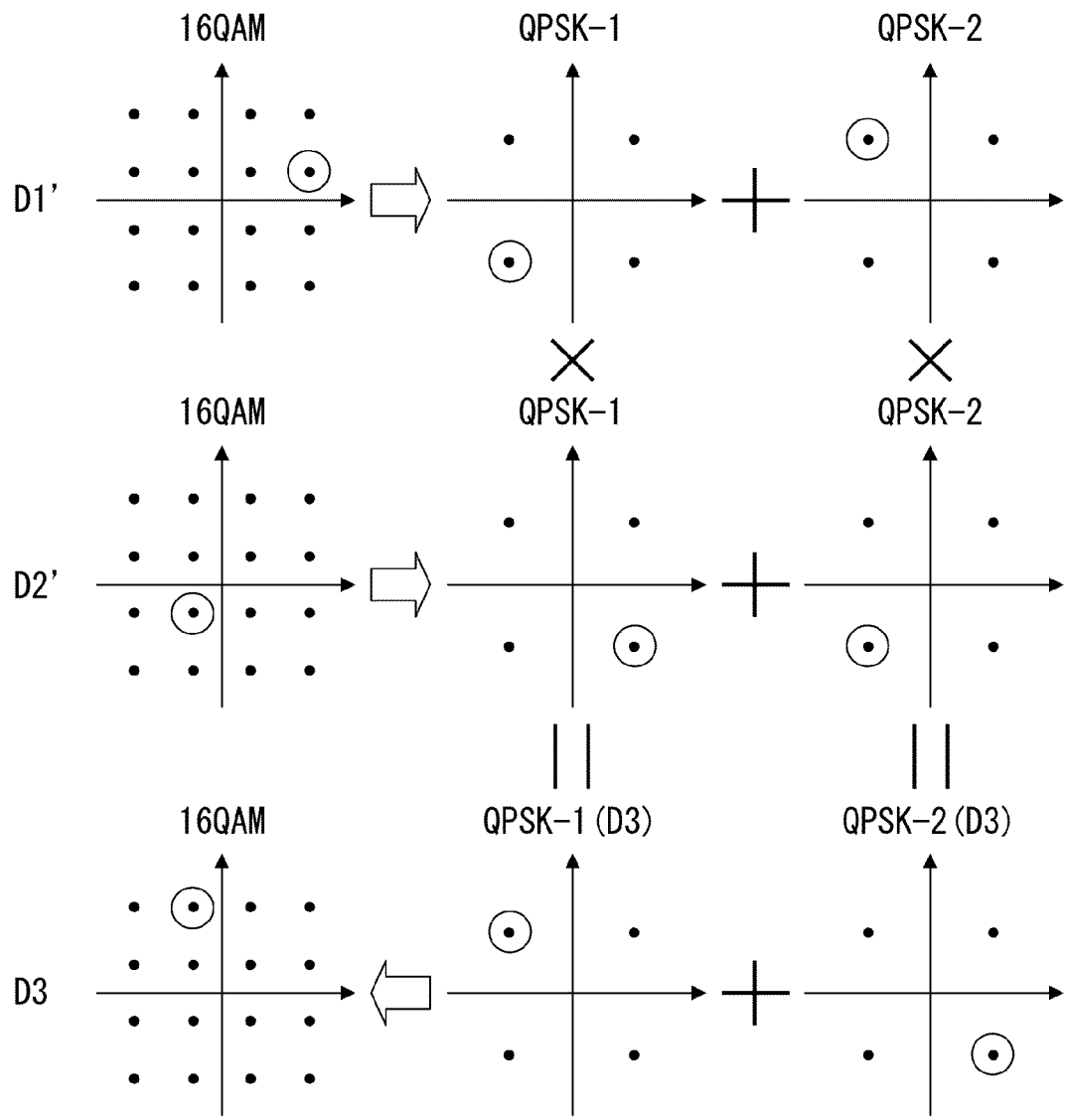
FIG. 7 is an explanatory view of multiplication operation when two links are 16 QAM.

FIG. 7 is an explanatory view of the multiplication operation when both links are 16QAM. When a set of 16 QAM symbols are multiplied by each other, the power of the result of the multiplication may increase according to the combination of the signal points. In this case, a larger dynamic range is required, and the demodulation/decode circuit is complicated. Therefore, in the network coding method according to the embodiment, the 16QAM symbol is mapped into two QPSK symbols (QPSK-1 and QPSK-2) as illustrated in FIG. 7.

The mapping from 16QAM constellation into QPSK constellation is performed as follows for example. That is, the 16QAM symbol is arranged corresponding to the 4-bit data. On the other hand, the QPSK symbol is arranged corresponding to the 2-bit data. Therefore, as an example, the signal point on the QPSK-1 constellation is arranged corresponding to the first and second bits of the 4-bit data of the 16QAM symbol, and the signal point on the QPSK-2 constellation is arranged corresponding to the third and fourth bits of the 4-bit data of the 16QAM symbol. That is, when the 4-bit data modulated by 16QAM is "0001", the QPSK-1 corresponds to "00", and the QPSK-2 corresponds to "01"

Next, the QPSK-1 of a set of links are multiplied by each other, and the QPSK-2 of a set of links are multiplied by each other. The multiplication operations are realized simply by the rotation of the phase. That is, the result of the multiplication of a set of QPSK symbols is represented by one QPSK symbol. In the example illustrated in FIG. 7, the QPSK-1 (D3) is obtained by multiplying two QPSK-1 symbols by each other, and the QPSK-2 (D3) is obtained by multiplying two QPSK-2 symbols by each other.

Furthermore, the two QPSK symbols obtained in the multiplication operations above are mapped into the 16 QAM symbol. In this case, the first and second bits of the 4-bit data transmitted by the 16 QAM symbol correspond to the 2-bit data represented by the QPSK-1 (D3), and the third and fourth bits correspond to the 2-bit data represented by the QPSK-2 (D3).

Thus, when both links are 16QAM, each 16QAM. symbol is mapped into two QPSK symbols and corresponding QPSK symbols are multiplied, respectively. Then the resultant symbols of the multiplications are further mapped into the 16QAM constellation. When both links are 64QAM, each 64QAM symbol is mapped into three QPSK symbols and corresponding QPSK symbols are multiplied, respectively. Then the three resultant symbols of the multiplication are further mapped into the 64QAM constellation.

When it is determined that the first link is to be modulated using 16QAM and the second link is to be modulated using 64QAM, the modulation method of the second link may be changed into 16QAM. However, the amount of data per symbol in 16QAM is smaller comparing with that of 64QAM. Therefore, in this case, it is necessary to enhance the coding rate of the second link.

In the above-mentioned communication system, the transmission between the base station BS and the relay station RS and the transmission between the mobile station MS and the relay station RS are not specifically restricted, but a signal may be transmitted between them using OFDM. In addition, the configuration between the base station BS and the relay station RS and the configuration between the mobile station MS and the relay station RS are not specifically restricted, but a MIMO (Multi-Input Multi-Output) system may be implemented.

Figure 8:
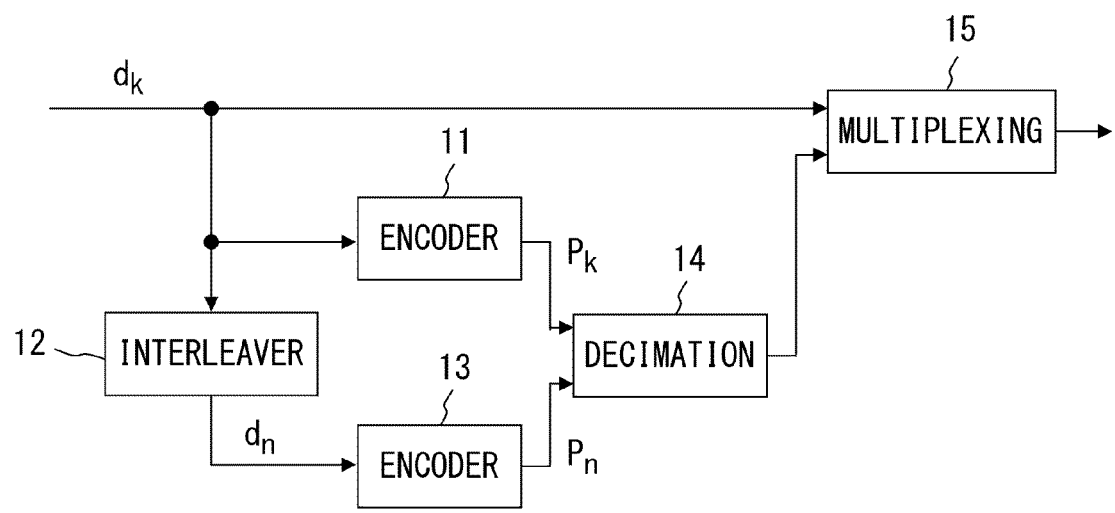
FIG. 8 illustrates a configuration of a turbo-coding circuit.

In the communication system above, when data are transmitted and received between the base station BS and the relay station RS and between the mobile station MS and the relay station RS, for example, turbo-coding is used. The turbo-coding circuit includes encoders 11 and 13, an interleaver 12, a decimation unit 14, and a multiplexer 15 as illustrated in FIG. 8. The encoder 11 generates a parity bit sequence $p_k$ from an information bit sequence $d_k$. The interleaver 12 generates a sequence $d_n$ by rearranging the information bit sequence $d_k$. The encoder 13 generates a parity bit sequence $p_n$ from the sequence $d_n$. The encoders 11 and 13 perform convolutional coding. The decimation unit 14 performs puncturing on the parity bit sequence $p_k$ and the parity bit sequence $p_n$ according to a specified rule. The multiplexer 15 multiplexes the information bit sequence and the selected parity bit sequence.

In the turbo-coding circuit with the above-mentioned configuration, a desired coding rate is obtained by, for example, changing the puncturing rule of the decimation unit 14. For example, when the number of parity bits to be selected is reduced, the coding rate is raised.

Figure 9:
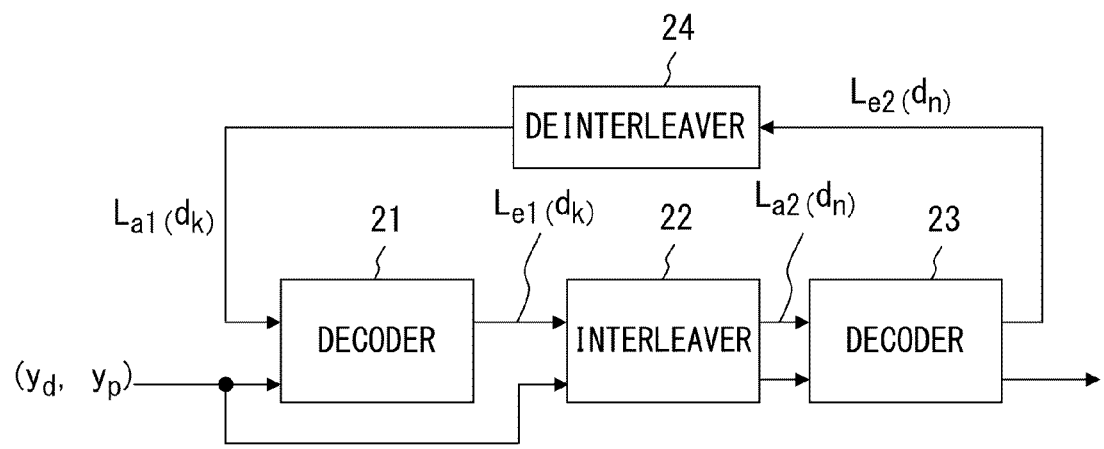
FIG. 9 illustrates a configuration of a turbo-decoding circuit.

FIG. 9 illustrates a configuration of the turbo-decoding circuit. The turbo-decoding circuit includes decoders 21 and 23, an interleaver 22, and a deinterleaver 24. It is assumed that the turbo-decoding circuit receives a received signal sequence ($y_d$, $y_p$) corresponding to the information bit and the parity bit. However, the received signal sequence includes noise.

The decoder 21 decodes the received signal sequence using a previous value $L_{a1}(d_k)$ indicating the reliability to output an external value $L_{e1}(d_k)$. The interleaver 22 rearranges the received signal sequence and the external value $L_{e1}(d_k)$, respectively. An external value $L_{a2}(d_n)$ output from the interleaver 22 indicates the increment of the reliability of a symbol. The decoder 23 decodes the rearranged signal sequence using the external value $L_{a2}(d_n)$. The deinterleaver 24 performs an inverse rearrangement on an external value $L_{e2}(d_n)$ output from the decoder 23 to obtain the previous value $L_{a1}(d_k)$. The previous value $L_{a1}(d_k)$ is provided for the decoder 21. The process above is repeatedly performed a plurality of times. Then the decoder 23 outputs the decoding result. Note that the initial value of the previous value $L_{a1}(d_k)$ is zero.

Figure 10:
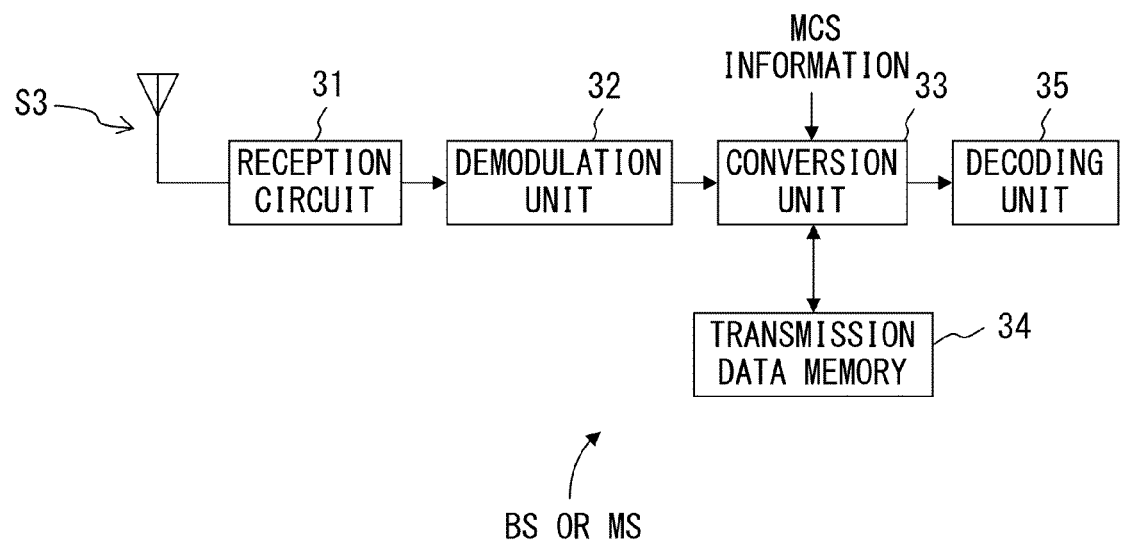
FIG. 10 illustrates a configuration of a reception circuit provided for a base station BS and a mobile station MS.

FIG. 10 illustrates a configuration of a reception circuit provided for the base station BS and the mobile station MS. The reception circuit provided for the base station BS and the reception circuit provided for the mobile station MS have basically the same configurations. In FIG. 10, a circuit not directly related to the network coding is omitted.

A reception circuit 31 receives the multicast signal S3 transmitted from the relay station RS. The multicast signal S3 propagates the uplink data and the downlink data as described above. A demodulation unit 32 demodulates the multicast signal S3. The demodulation result by the demodulation unit 32 is a symbol sequence obtained by multiplying the symbol for transmitting the uplink data and the symbol for transmitting the downlink data by each other.

A conversion unit 33 detects a signal point of the symbol of the multicast signal S3 using, for example, a Zero-Forcing method. That is, the conversion unit 33 obtains a hard-decision bit of the symbol of the multicast signal S3. Since the Zero-Forcing method is well known technology, the detailed description is omitted here, and the transmission signal is estimated from the received signal.

When a division operation is performed between QPSK symbol and QAM symbol, it is not necessary to use the Zero-Forcing method. The Zero-Forcing method is required between 16QAM symbol and 16QAM symbol, and between 64QAM symbol and 64QAM symbol. Since a division operation cannot be directly performed between 16QAM symbol and 16QAM symbol, and between 64QAM symbol and 64QAM symbol, it is necessary to roughly detect a bit level by the Zero-Forcing method.

Then, the conversion unit 33 obtains data to be received using the transmission data held in transmission data memory 34. That is, in the base station BS, the uplink data is extracted from the received signal using the downlink data previously transmitted to the mobile station MS. On the other hand, in the mobile station MS, the downlink data is extracted from the received signal using the uplink data previously transmitted to the base station BS.

Figure 11:
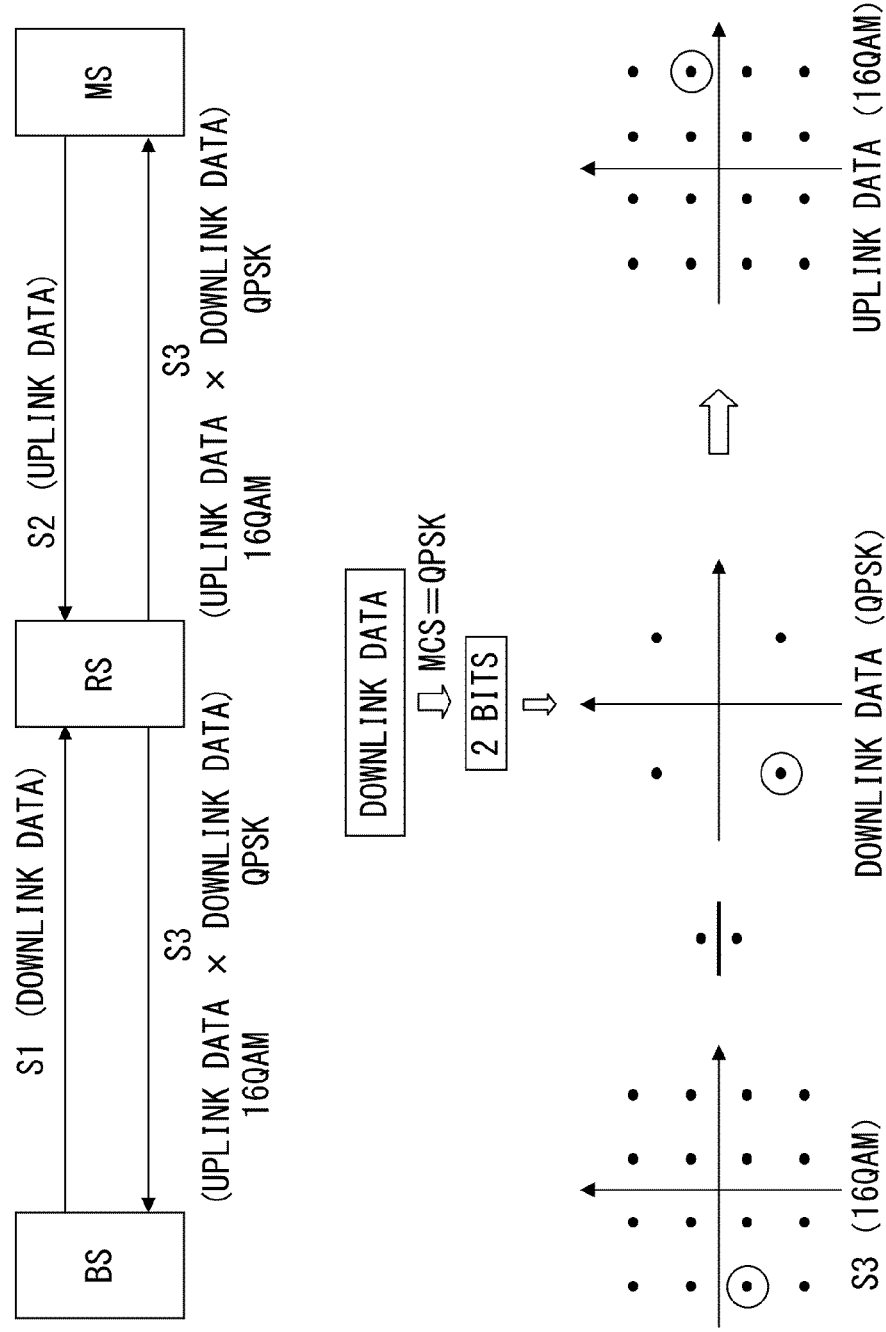
FIG. 11 is an explanatory view of a method for extracting uplink data in the base station BS.

FIG. 11 is an explanatory view of the method of extracting the uplink data in the base station BS. The multicast signal S3 transmitted from the relay station RS to the base station BS and the mobile station MS is generated by multiplying the symbol of the uplink data and the symbol of the downlink data by each other. It is assumed that the uplink data is modulated using 16QAM, and the downlink data is modulated using QPSK. It is also assumed that the base station BS has received the MCS information indicating that the downlink data transmitted from the relay station RS to the mobile station MS has been modulated using QPSK through the control channel.

In this case, the conversion unit 33 of the base station BS extracts the downlink data stored in the transmission data memory 34, and sections the transmission data at every second bit. Each 2-bit data is sequentially arranged at a corresponding signal point (QPSK constellation) depending on its value (00, 01, 11, 10). Then, an inverse multiplication (or division) operation is sequentially performed on each symbol of the multicast signal by a corresponding QPSK symbol. This process corresponds to an inverse operation of the multiplication illustrated in FIG. 6. By this operation, symbols of the uplink data are sequentially obtained. In the mobile station MS, the downlink data is extracted from the multicast signal in a similar operation.

A decoding unit 35 decodes a data sequence output from the conversion unit 33. The decoding unit 35 may be a turbo-decoding circuit illustrated in FIG. 9 in the embodiment. The decoding process of the decoding unit 35 obtains the most likely data.

Described next is the reliability of the network coding according to the embodiment. In the description below, the block size of a packet for transmitting data from the relay station RS to the base station BS and the mobile station MS is defined as $N_B$. $X_k(n)$ indicates the n-th symbol in the k-th link (n=0, 1, . . . , $N_B$−1 k=1, 2). It assumed that the quality of a link 1 is good, but the quality of a link 2 is lower than a threshold level. That is, the signal of the link 2 is modulated using QPSK.

In this case, in the relay station RS, a symbol X(n) in the multicast signal is expressed by the following equation.

$$X(n) = \sqrt{2} Re[X_1(n)] \cdot Re[X_2(n)] + j\sqrt{2} Im[X_1(n)] \cdot Im[X_2(n)]$$

Considering the interference and noise, the received symbol R(n) in the base station BS and/or mobile station MS is expressed by the following equation.

$$R_k(n) = H_k(n) \cdot X(n) + \eta_k(n)$$

or $$\hat{R}_k(n) = X(n) + \frac{\eta_k(n)}{H_k(n)}$$

$\eta_k(n)$ is a noise component. $H_k(n)$ is a function indicating a channel characteristic, and depends on the transmission power of the k-th link.

When the base station BS and/or the mobile station MS performs division (de-multiplication) operation using a transmission symbol (own symbol), a resultant symbol of the operation is expressed by the following equation.

$$\hat{X}_1(n) = \frac{Re[\hat{R}_1(n)]}{\sqrt{2} Re[X_2(n)]} + j\frac{Im[\hat{R}_1(n)]}{\sqrt{2} Im[X_2(n)]} \quad (1)$$

and $$\hat{X}_2(n) = \frac{Re[\hat{R}_2(n)]}{\sqrt{2} Re[X_1(n)]} + j\frac{Im[\hat{R}_2(n)]}{\sqrt{2} Im[X_1(n)]} \quad (2)$$

The following equation (3) is obtained by simplifying the equations (1) and (2).

$$\hat{X}_k(n) = X_k(n) + \xi_k(n) \quad (3)$$

where $$\xi_1(n) = \frac{Re\left[\frac{\eta_1(n)}{H_1(n)}\right]}{\sqrt{2} Re[X_2(n)]} + j\frac{Im\left[\frac{\eta_1(n)}{H_1(n)}\right]}{\sqrt{2} Im[X_2(n)]}$$

and $$\xi_2(n) = \frac{Re\left[\frac{\eta_2(n)}{H_2(n)}\right]}{\sqrt{2} Re[X_1(n)]} + j\frac{Im\left[\frac{\eta_2(n)}{H_2(n)}\right]}{\sqrt{2} Im[X_1(n)]}$$

The following assumption is introduced as an expected value E (that is an average value).

$$E|\eta_k(n)|^2 = \sigma^2 \quad (4)$$

$$E|H_k(n)|^2 = h_k^2 \quad (5)$$

$$E|X_k(n)|^2 = 1 \quad (6)$$

Figure 1A:
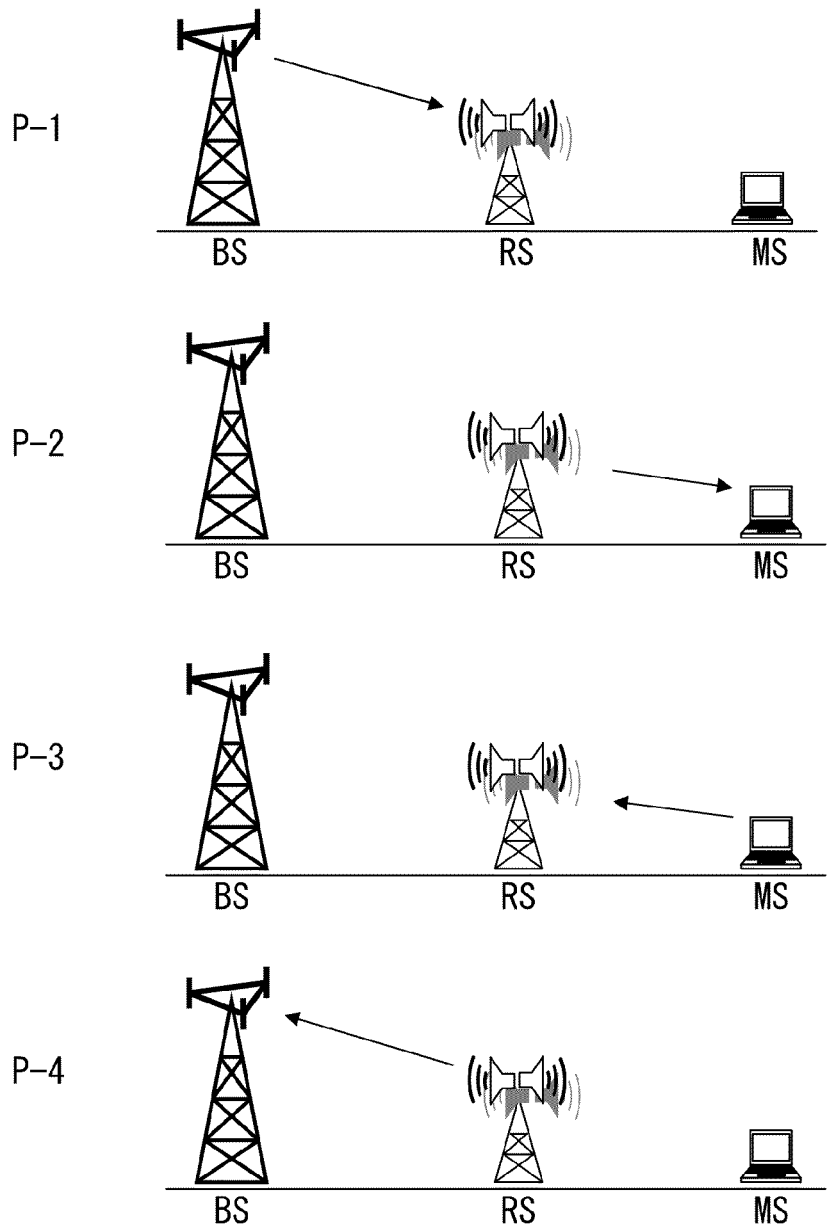
FIG. 1A illustrates a classical relay system.
Figure 1:
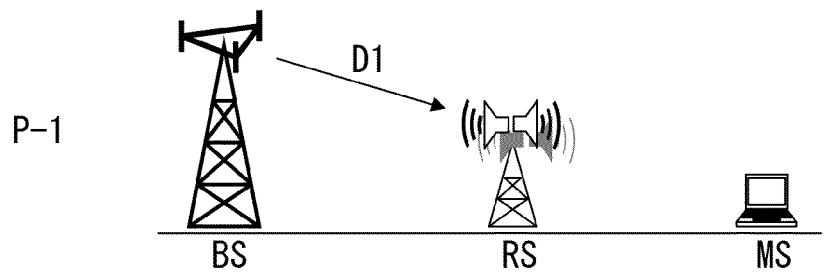
FIG. 1B illustrates an example of a conventional network coding system (DF relaying)
FIG. 1C illustrates another example of a conventional network coding system (AF relaying)
Figure 1:
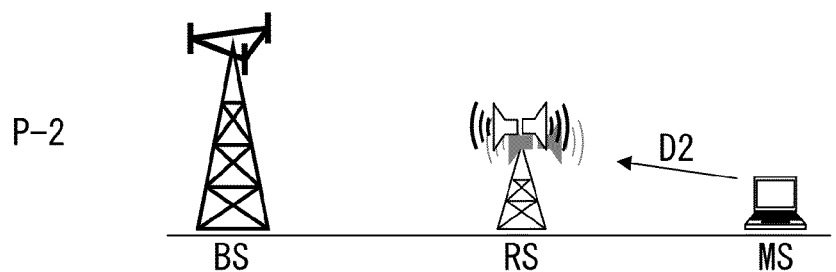
Figure 1:
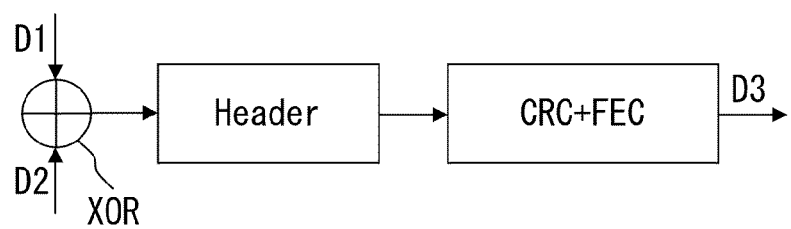
Figure 1:
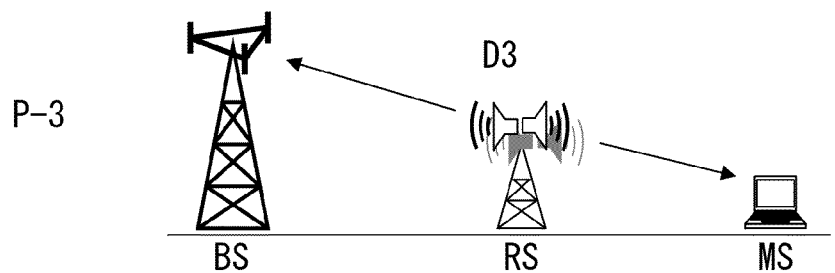
Figure 1C:
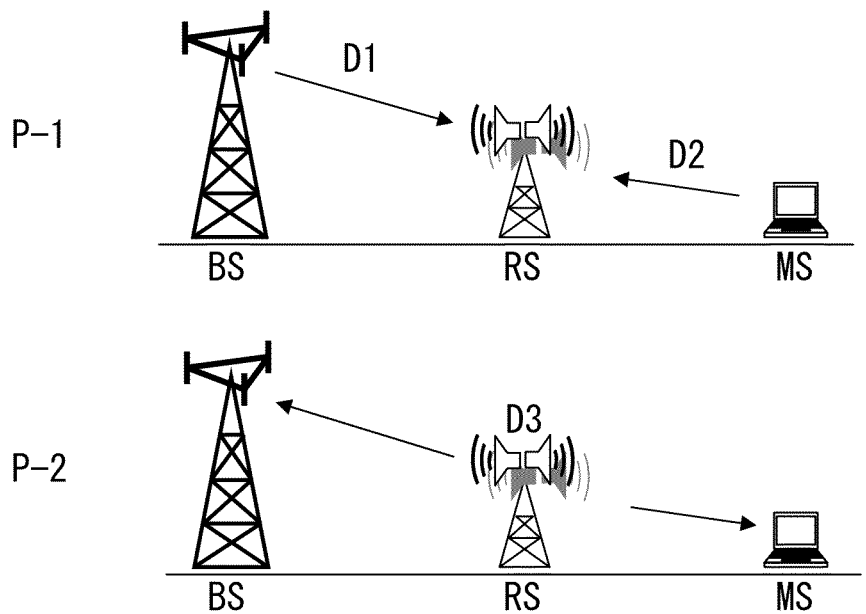

The variance of $1/\xi_k(n)$, that is, an SNR (signal-to-noise ratio) is expressed by the following equation in the DF relaying illustrated in FIG. 1B.

$$E\left|\frac{1}{\xi_k(n)}\right|^2 = \left(\frac{h_k}{\sigma}\right)^2 \quad (7)$$

In the network coding according to the embodiment, the following result is obtained by implementing the equations (4) through (6) above. That is, the SNR in the system according to the embodiment is substantially the same as in the conventional DF relaying expressed by the equation (7).

$$E|\xi_1(n)|^2 = E\left|\frac{Re\left[\frac{\eta_1(n)}{H_1(n)}\right]}{\sqrt{2} Re[X_2(n)]} + j\left(\frac{Im\left[\frac{\eta_1(n)}{H_1(n)}\right]}{\sqrt{2} Im[X_2(n)]}\right)\right|^2$$

$$= E\left(\frac{Re\left[\frac{\eta_1(n)}{H_1(n)}\right]}{Re[X_2(n)]}\right)^2$$

$$= \frac{E\left(Re\left[\frac{\eta_1(n)}{H_1(n)}\right]\right)^2}{E(Re[X_2(n)])^2}$$

$$= \frac{\frac{\sigma^2}{2h_1^2}}{\frac{1}{2}} = \frac{\sigma^2}{h_1^2}$$

FIG. 12 is a table for system comparison between the conventional system and the embodiment. SNR of the network coding according to the embodiment is the same as that of the conventional DF relaying as described above. That is, the network coding according to the embodiment is as reliable as the conventional DF relaying. In addition, since the network coding according to the embodiment may determine MCS (modulation method and coding rate in this embodiment) for each link, the flexibility (or freedom) of communications is higher than in the conventional DF relaying and AF relaying. Thus, according to the system of the embodiment, data is transmitted more efficiently than by the conventional DF relaying, while maintaining the reliability equivalent to the conventional DF relaying.

When there is a problem with a peak-to-average ratio (PAPR), the relay station RS uses QPSK for a link with quality lower than a threshold level in the network coding according to the embodiment. That is, to widely use the network coding according to the embodiment, it is preferable that QPSK may be used at a higher probability.

Figure 14:
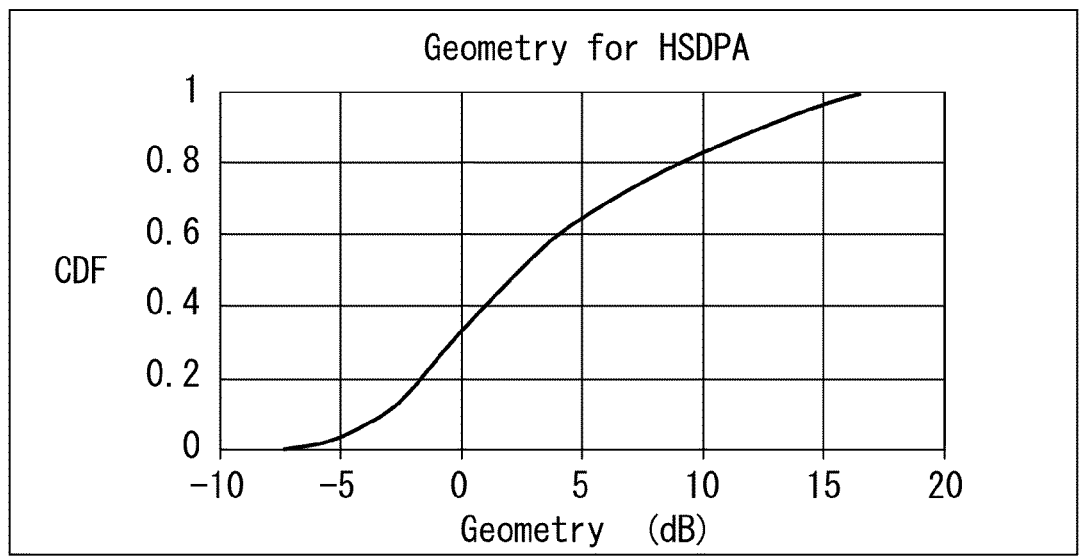
FIG. 14 illustrates a cumulative distribution function with respect to SNR in HSDPA.

FIG. 13 illustrates the relationship between SNR and amount of mutual information (MI). In FIG. 13, the mutual information for each symbol with respect to QPSK, 16QAM, and 64QAM is illustrated. As illustrated in FIG. 13, when SNR is up to 5 dB, there is no throughput sacrifice in a case where data is transmitted using QPSK as compared with using high multi-level QAM. Here, in a practical cellular system such as HSDPA, it is known that about 40 percent users experience SNR beyond 5 dB, as illustrated in FIG. 14. FIG. 14 illustrates a cumulative distribution function (CDF) with respect to SNR in HSDPA. Accordingly, in the practical cellular system, the probability at which the QPSK is available in at least one of the links in order to use the network coding according to the embodiment is up to 84 percent ($=1-0.4^2$).

<Other Embodiments>

The efficiency of the network coding according to the embodiment is much higher than the conventional DF relaying when the link from the relay station RS to the base station BS and the link from the relay station RS to the mobile station MS are unbalanced. However, in the actual cellular system, the set of links above is not always unbalanced. That is, the quality of the set of links is often balanced. However, the balanced quality of one set of links is attained at the rate of 16 percent or less. In such communication environment, the DF relaying system to perform exclusive-OR operation on each bit may also realize high throughput. In the network coding method according to another embodiment, the configuration for adaptively selecting the scheme to perform a multiplication on each symbol and the scheme to use the conventional exclusive-OR operation is implemented.

Figure 15:
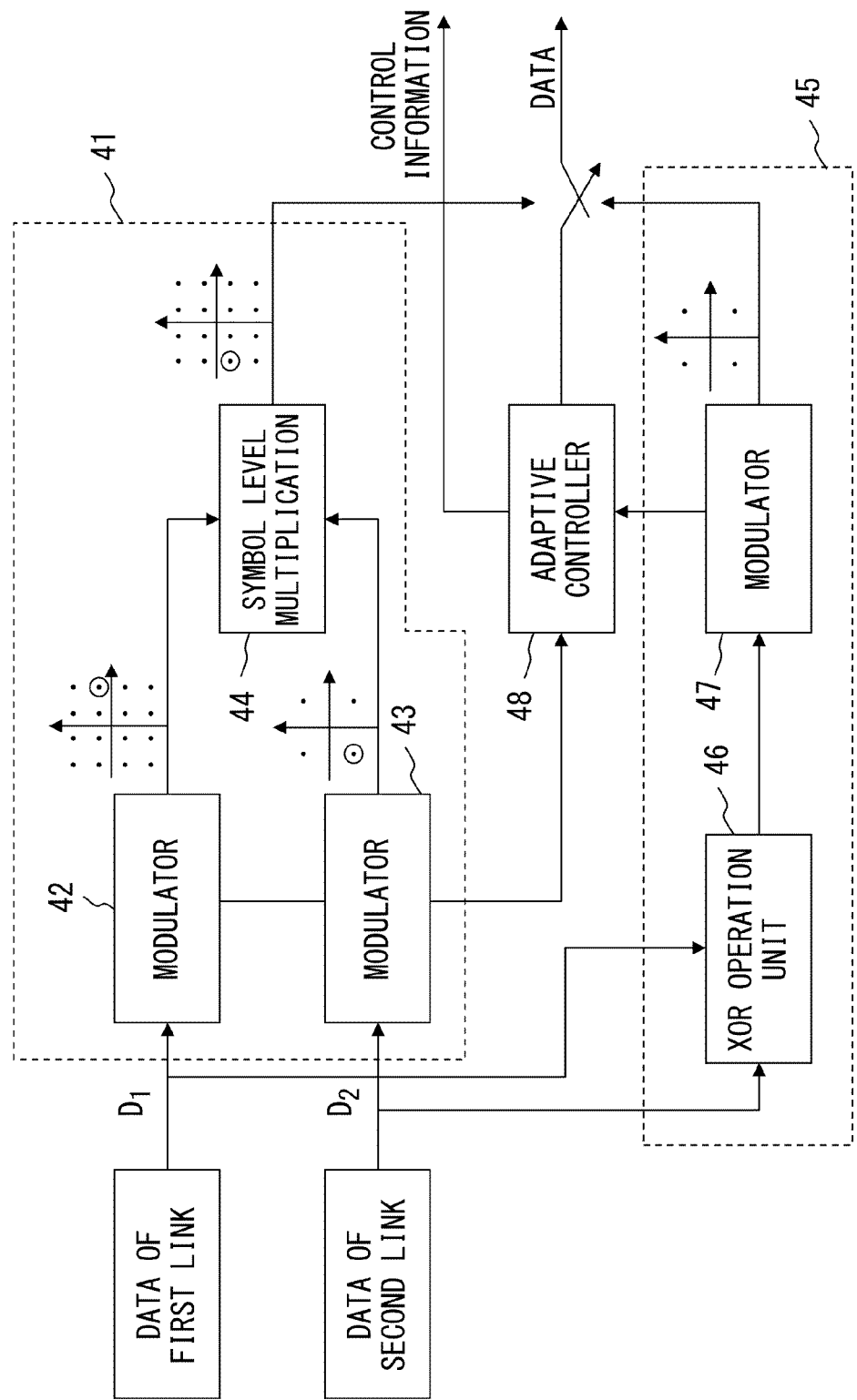
FIG. 15 illustrates a configuration of a transmitter for realizing network coding according to another embodiment.

FIG. 15 illustrates a configuration of a transmitter for realizing the network coding according to another embodiment. A symbol level modulation circuit 41 includes modulators 42 and 43, and a symbol level multiplication unit 44. The modulators 42 and 43 correspond to the MCS unit 5, and the symbol level multiplication unit 44 corresponds to the multiplication unit 6. The symbol level modulation circuit 41 determines the MCS (the modulation method and the coding rate in this embodiment) for each link in one set of links, and calculates total throughput $T_{SLM}$. The throughput T is proportional to the product of the number of bits per symbol and the coding rate, and is calculated depending on the determined MCS.

An XOR circuit 45 includes an XOR operation unit 46 and a modulator 47, and determines the MCS of the link with lower quality. The XOR operation unit 46 performs an exclusive-OR operation for each bit of one set of data sequences. The modulator 47 modulates the data sequence output from the XOR operation unit 46 with the determined MCS. Furthermore, the XOR circuit 45 calculates total throughput $T_{XOR}$.

An adaptive controller 48 compares the total throughput $T_{SLM}$ when symbol level multiplication is used with the total throughput $T_{XOR}$ when XOR operation is used. Then, the transmitter selects and outputs the modulated data obtained by the scheme of higher total throughput. The selection result is transmitted as control information to the receiver station (base station BS and mobile station MS).

Figure 16:
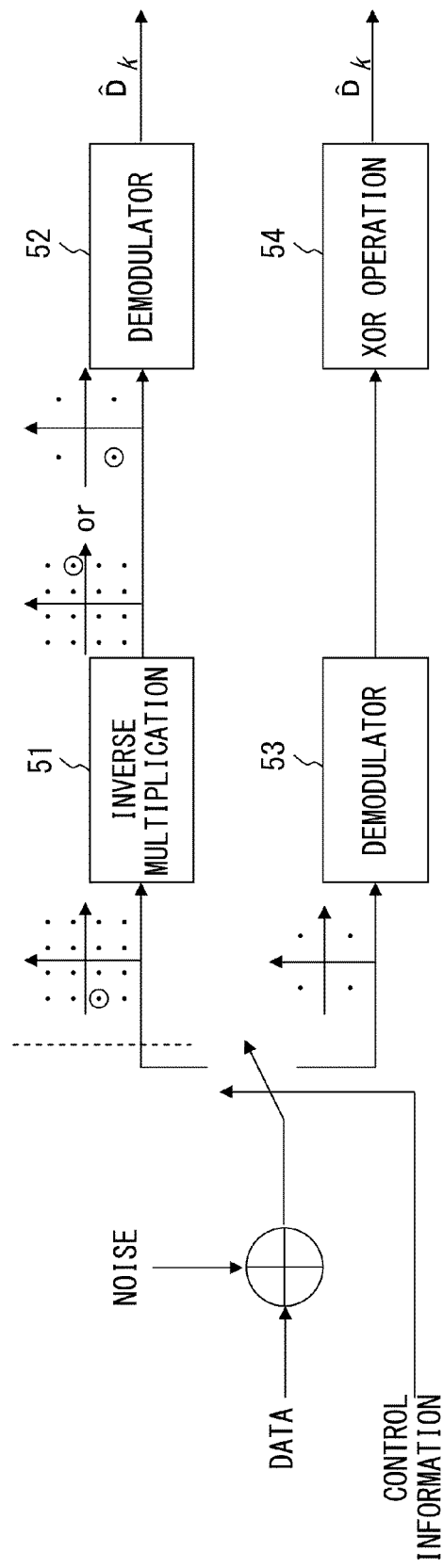
FIG. 16 illustrates a configuration of a receiver for realizing network coding according to another embodiment.

FIG. 16 illustrates a configuration of a receiver for receiving a signal transmitted from the transmitter illustrated in FIG. 15. The received data is guided to an inverse multiplication unit 51 or a demodulator 53 according to the control information transmitted from the transmitter. The inverse multiplication unit 51 corresponds to the conversion unit 33 illustrated in FIG. 10, and performs the operation illustrated in FIG. 11. A demodulation unit 52 regenerates transmission data by demodulating the output of the inverse multiplication unit 51. On the other hand, the demodulator 53 demodulates the received signal. Then, an XOR operation unit 54 regenerates the transmission data by performing XOR operation on the output data sequence of the demodulator 53.

Thus, according to the other embodiment, data can be relayed by a scheme of higher throughput. That is, for example, when the quality of the link between the relay station RS and the base station BS and the quality of the link between the relay station RS and the mobile station MS are balanced, the data is relayed using Bit-Wise XOR operation. On the other hand, if the links are unbalanced, the data is relayed using symbol level multiplication. Therefore, the data transmission efficiency is improved for the entire system.

<Others>

In the embodiments above, the systems bi-directionally transmit data between a pair of communication devices, but the invention is not limited to that configuration. That is, the relay station RS may relay data among M (M indicates an integer of 3 or more) communication devices. In this case, for example, data is transmitted using QPSK through p links whose quality is lower than a threshold level, and data is transmitted using NQAM (N=16, 64, etc.) in M-p links with good quality. In this case, the relay station RS may perform the multiplication as described below.

(1) One new QPSK symbol is generated by multiplying p QPSK symbols by one another.
(2) One new NQAM symbol is generated by multiplying M-p QPSK symbols by one another.
(3) A multicast symbol is generated by multiplying the new QPSK symbol and the new NQAM symbol. The multicast symbol is modulated using NQAM.

A receiving station for receiving the multicast symbol roughly detects a signal point of the multicast symbol by, for example, the Zero-Forcing method. Then, a corresponding data bit is obtained by performing inverse multiplication, and data is regenerated using turbo-decoding.

In the embodiments above, the systems transmit a radio signal, but the invention is not limited to this configuration, and may be applied to wired system.

What is claimed is:

1. A network coding method for transmitting a signal between a first communication device and a second communication device through a third communication device, comprising:
determining a first communication scheme for transmitting to the first communication device first data received from the second communication device;

determining a second communication scheme for transmitting to the second communication device second data received from the first communication device;

generating a multicast signal by complex multiplying a first symbol sequence of at least two bits representing at least a first set of complex numbers obtained by modulating, by a first modulation scheme the first data according to the first communication scheme by a second symbol sequence of at least two bits representing at least a second set of complex numbers obtained by modulating, by a first modulation scheme the second data according to the second communication scheme for each symbol; and transmitting the multicast signal from the third communication device to the first and second communication devices.

2. The method according to claim 1, wherein the first communication scheme is determined according to communication quality between the first communication device and the third communication device, and the second communication scheme is determined according to communication quality between the second communication device and the third communication device.

3. The method according to claim 1, wherein at least one of the first and second modulation scheme is QPSK.

4. The method according to claim 1, wherein the first modulation scheme is QPSK, and the second modulation scheme is 16QAM or 64QAM.

5. The method according to claim 1, wherein when the first and second modulation schemes are 16QAM, each 16QAM symbol is mapped into two QPSK symbols and corresponding QPSK symbols are multiplied by each other.

6. The method according to claim 1, wherein when the first and second modulation schemes are 64QAM, each 64QAM symbol is mapped into three QPSK symbols and corresponding QPSK symbols are multiplied by each other.

7. The method according to claim 1, wherein information indicating the first and second modulation schemes is notified to the first and second communication devices.

8. The method according to claim 1, wherein
the first data is regenerated by inversely multiplying the multicast signal by a corresponding symbol of the second data in the first communication device.

9. The method according to claim 1, wherein
the first communication device is a base station, the second communication device is a mobile station, and the third communication device is a relay station.

10. A network coding method for transmitting a signal between a first communication device and a second communication device through a third communication device, comprising:
determining a first communication scheme for transmitting to the first communication device first data received from the second communication device;
determining a second communication scheme for transmitting to the second communication device second data received from the first communication device;
generating a multicast signal by multiplying a first symbol sequence obtained by processing the first data according to the first communication scheme by a second symbol sequence obtained by processing the second data according to the second communication scheme for each symbol; and
transmitting the multicast signal from the third communication device to the first and second communication devices, wherein the first data is regenerated by inversely multiplying the multicast signal by a corresponding symbol of the second data in the first communication device;
detecting a symbol from the multicast signal using Zero-Forcing method;
regenerating a data bit by inverse-multiplying the detected symbol by a corresponding symbol of the second data; and
decoding the regenerated data bit by turbo-decoding.

11. A network coding method for transmitting a signal from a transmitting device to a plurality of receiving devices, comprising:
determining communication schemes for transmitting corresponding data to each of the receiving devices, respectively;
generating a multicast signal by complex multiplying a plurality of symbol sequences of at least two bits representing at least a first and second set of complex numbers obtained by modulating, by a first and second modulation scheme data to be transmitted to the plurality of receiving devices with corresponding communication schemes for each symbol; and
transmitting the multicast signal to the plurality of receiving devices.

12. A network coding apparatus for relaying a signal between a first communication device and a second communication device, comprising:
a decision unit to determine a first communication scheme for transmitting to the first communication device first data received from the second communication device, and for determining a second communication scheme for transmitting to the second communication device second data received from the first communication device;
a multiplication unit to generate a multicast signal by complex multiplying a first symbol sequence of at least two bits representing at least a first set of complex numbers obtained by modulating, by a first modulation scheme the first data according to the first communication scheme by a second symbol sequence of at least two bits representing at least a second set of complex numbers obtained by modulating, by a first modulation scheme the second data according to the second communication scheme for each symbol; and
a transmission unit to transmit the multicast signal to the first and second communication devices.

13. The apparatus according to claim 12, wherein
the decision unit determines the first communication scheme according to communication quality between the first communication device and the network coding apparatus, and determines the second communication scheme according to communication quality between the second communication device and the network coding apparatus.

14. A network coding apparatus for relaying a signal between a first communication device and a second communication device, comprising:
a decision unit to determine a first communication scheme for transmitting to the first communication device first data received from the second communication device, and for determining a second communication scheme for transmitting to the second communication device second data received from the first communication device;
a multiplication unit to generate a multicast signal by multiplying a first symbol sequence obtained by processing the first data according to the first communication scheme by a second symbol sequence obtained by processing the second data according to the second communication scheme for each symbol; and a transmission unit to transmit the multicast signal to the first and second communication devices, wherein the decision unit is further adapted to determine the first communication scheme according to communication quality between the first communication device and the network coding apparatus, and determine the second communication scheme according to communication quality between the second communication device and the network coding apparatus; and an operation unit to perform an exclusive-OR operation on the first and the second data for each bit, and for generating an auxiliary multicast signal from the operation result; and a selection unit to select one of the multicast signal and the auxiliary multicast signal, wherein the transmission unit transmits the signal selected by the selection unit to the first and second communication devices.

15. The apparatus according to claim 14, wherein
the selection unit selects the multicast signal or the auxiliary multicast signal with higher throughput.

* * * * *